(12) United States Patent
Fludger et al.

(10) Patent No.: US 7,209,670 B2
(45) Date of Patent: Apr. 24, 2007

(54) POLARIZATION DIVERSITY RECEIVER FOR OPTICAL TRANSMISSION SYSTEM

(75) Inventors: Christopher Fludger, Cambridge (GB); Richard Epworth, Sawbridgeworth (GB); Alan Robinson, Harlow (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 695 days.

(21) Appl. No.: 10/425,810

(22) Filed: Apr. 29, 2003

(65) Prior Publication Data

US 2004/0218933 A1 Nov. 4, 2004

(51) Int. Cl.
*H04B 10/06* (2006.01)
*H04B 10/156* (2006.01)

(52) U.S. Cl. ...................... 398/205; 398/212
(58) Field of Classification Search ............. 398/205, 398/208, 212, 209
See application file for complete search history.

(56) References Cited

U.S. PATENT DOCUMENTS

| 3,310,677 | A  | * | 3/1967 | Pierce et al. | ............... | 398/205 |
| 6,359,716 | B1 | * | 3/2002 | Taylor | ........................ | 398/212 |
| 6,862,413 | B2 | * | 3/2005 | Bessios | ...................... | 398/208 |
| 2003/0016425 | A1 | * | 1/2003 | Tan et al. | .................... | 359/192 |
| 2003/0058504 | A1 | * | 3/2003 | Cho et al. | .................... | 359/161 |

OTHER PUBLICATIONS

J H Winters and R D Gitlin, "Electrical Signal Processing Techniques in Long-Haul Fiber-Optic Systems", IEEE Trans Commun, vol. 38, pp. 1439-1453, Sep. 1990.

H Bulow et al, "Adaptive PMD Mitigation at 10 Gbit/s Using an Electronic SiGe Equaliser IC", in Proc ECOC 1999, vol. II, pp. 138-139.

B W Hakki, "Polarization Mode Dispersion Compensation by Phase Diversity Detection" IEEE Photon Technol Lett, vol. 9, Jan. 1997, pp. 121-123.

H Bulow, "Equalization of Bit Distortion Induced by Polarization Mode Dispersion", Proc NOC 1997, pp. 65-72.

A O Lima et al, "A Novel Polarization Diversity Receiver for PMD Mitigation", IEEE Photon Technol Lett, vol. 14, No. 4, Apr. 20002 465.

* cited by examiner

*Primary Examiner*—Leslie Pascal
(74) *Attorney, Agent, or Firm*—Barnes & Thornburg LLP

(57) ABSTRACT

A polarization diversity receiver has an optical section for converting the received optical signal into four or five polarization diverse component optical signals that substantially represent amplitude and polarization state information of the received optical signal, by respective polarization transformations to respective points on a Poincaré sphere, the points being equally spaced apart to maximize polarization diversity, even in the worst case input polarization state. Detectors produce component electrical signals from each of the component optical signals, for electronic processing to compensate for PMD. By reducing the number of component optical signals significant cost and size reductions are enabled. The need for precise polarization tracking in the receiver can be reduced or eliminated completely. Balanced detectors can be used to reduce the number of electrical signals. The electrical processing can use sequence detection.

23 Claims, 8 Drawing Sheets

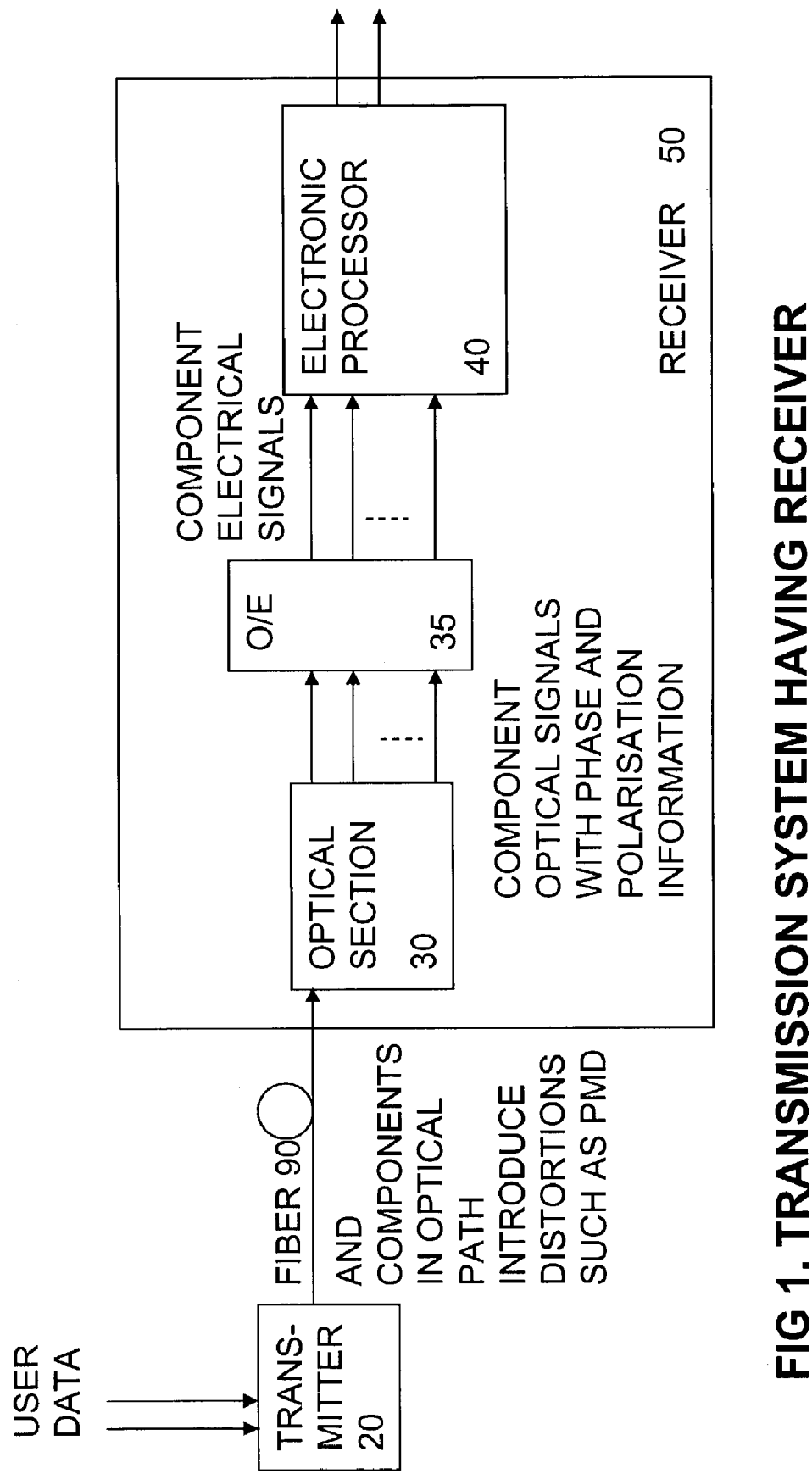
FIG 1. TRANSMISSION SYSTEM HAVING RECEIVER

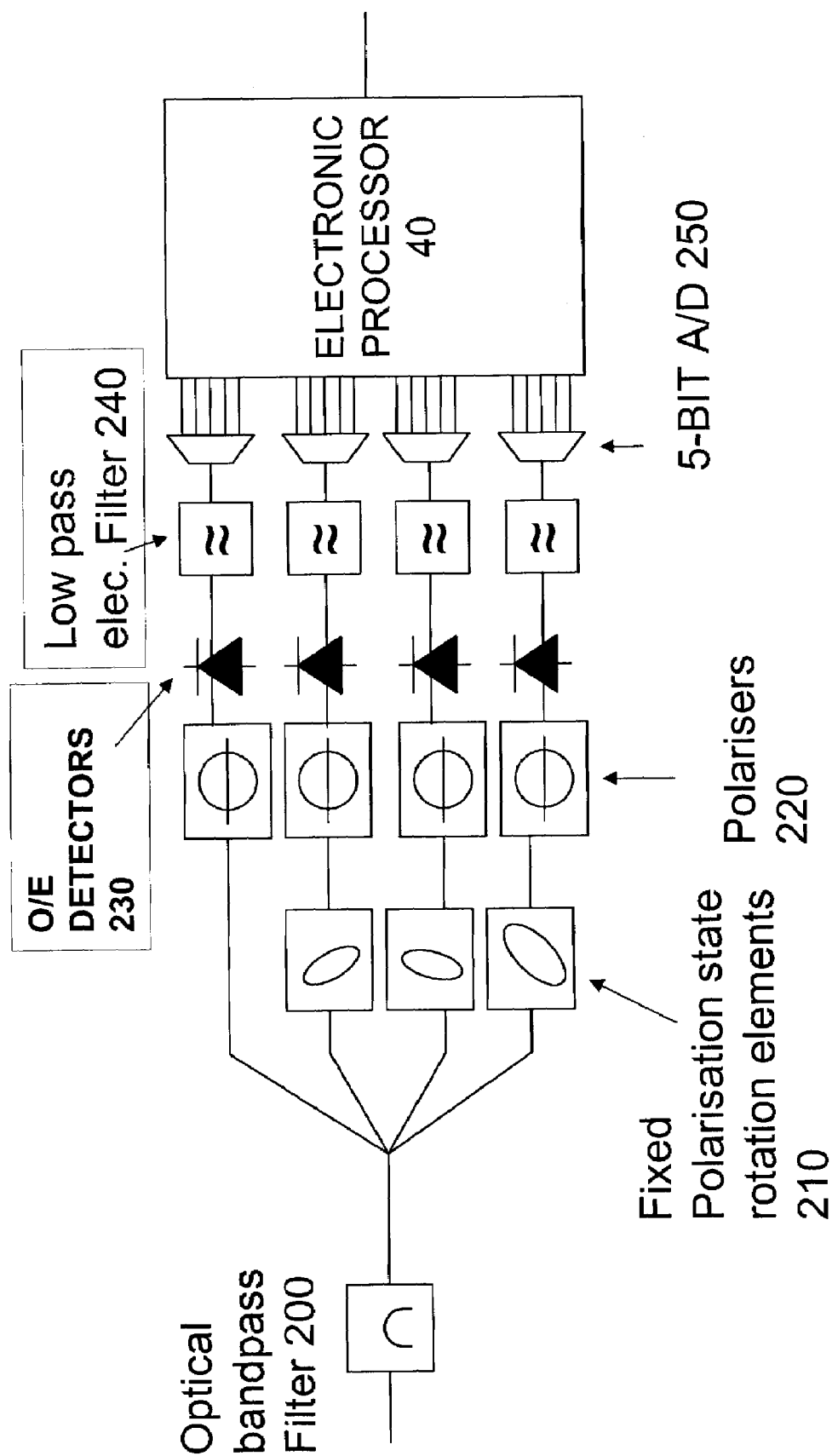
FIG 2. RECEIVER

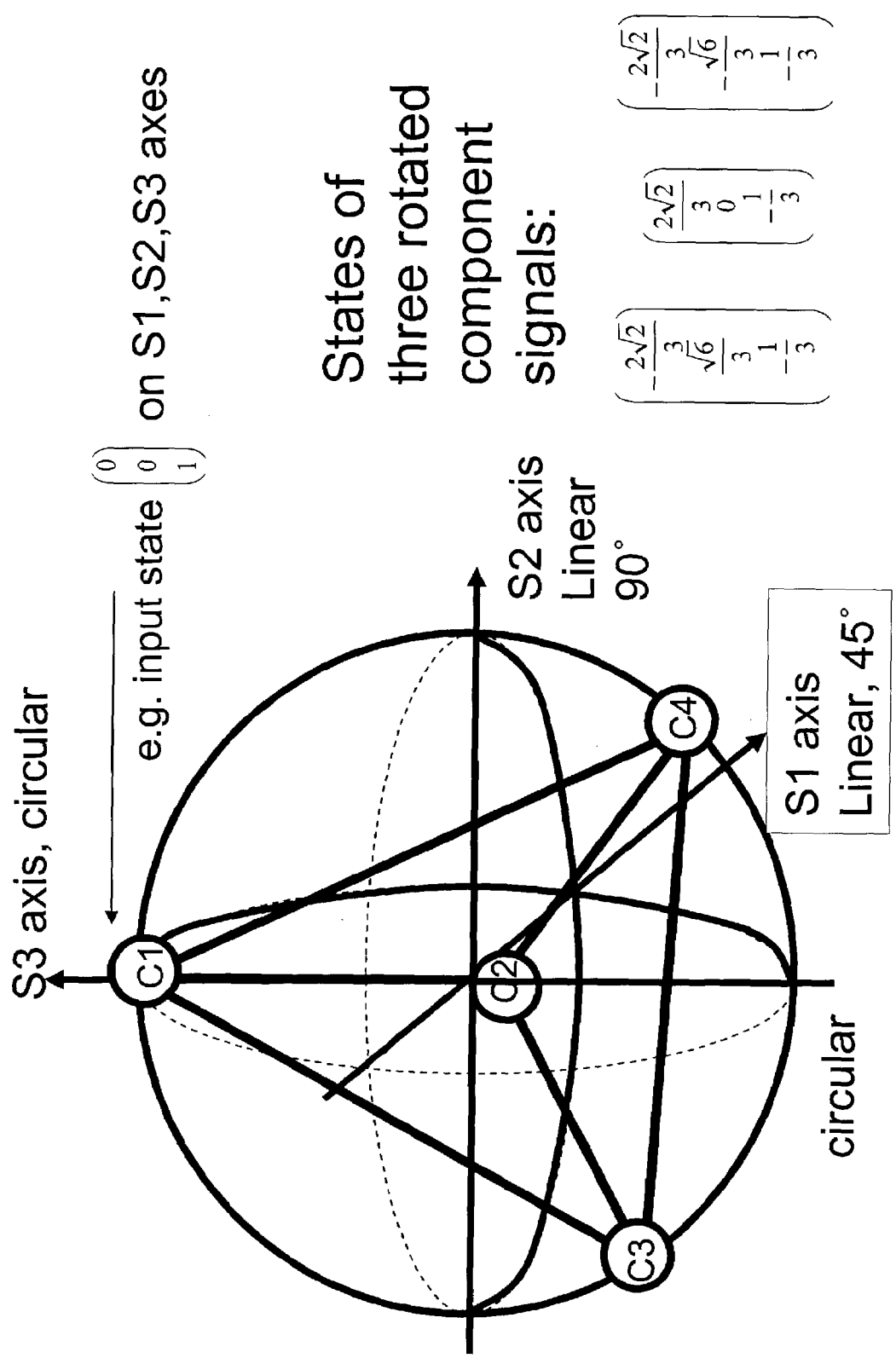
FIG 3. POINCARE SPHERE FOR FOUR OPTICAL COMPONENT SIGNALS

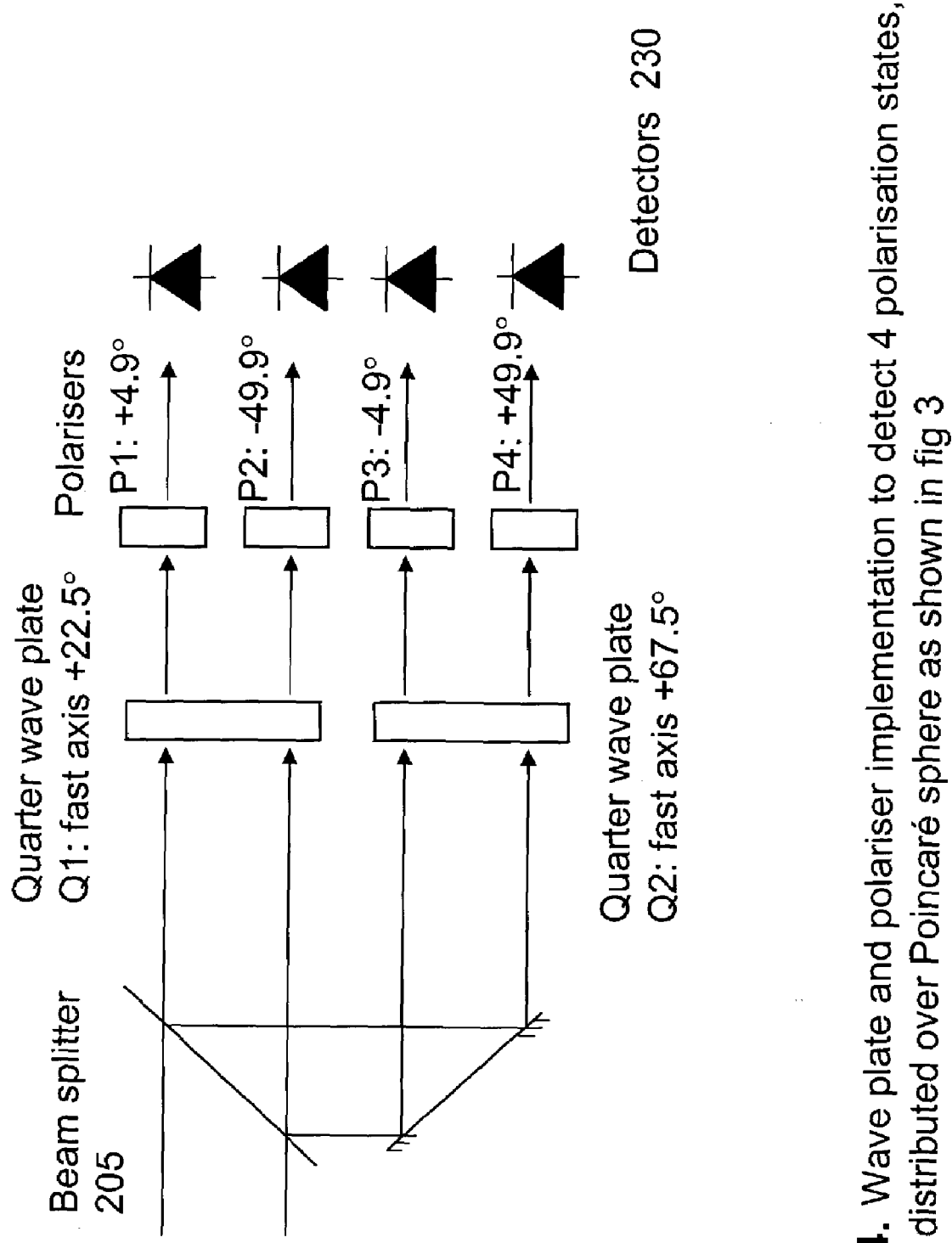
Figure 4. Wave plate and polariser implementation to detect 4 polarisation states, uniformly distributed over Poincaré sphere as shown in fig 3

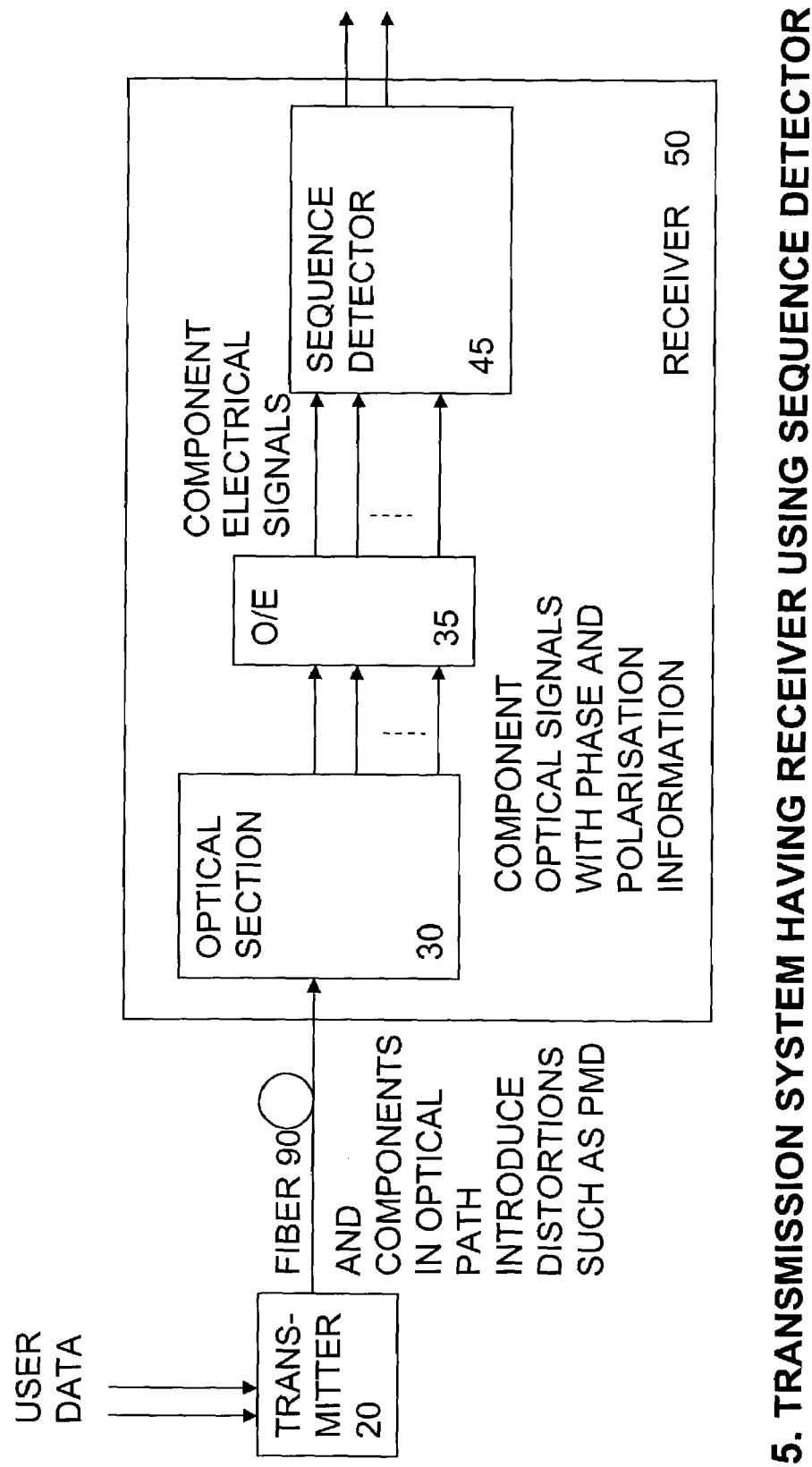
FIG 5. TRANSMISSION SYSTEM HAVING RECEIVER USING SEQUENCE DETECTOR

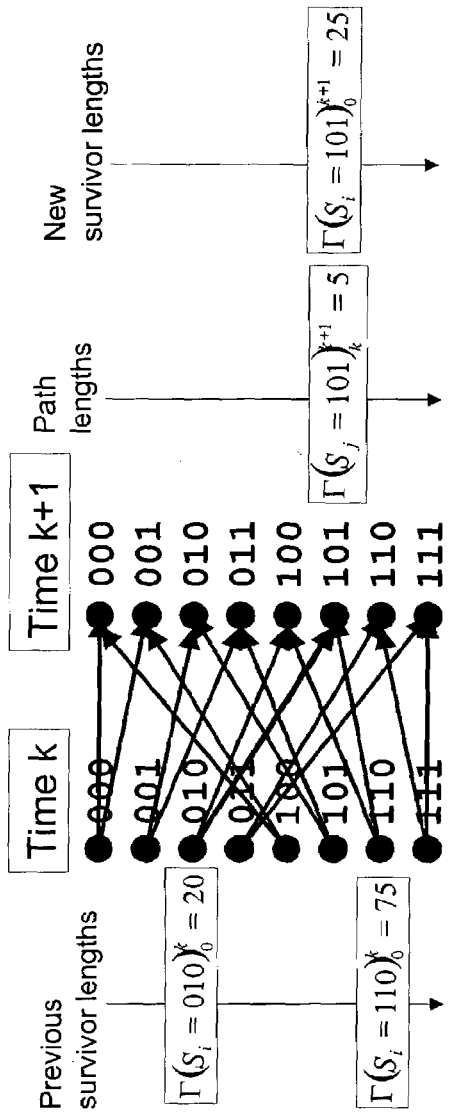
FIG 7. 3-BIT MLSE TRELLIS
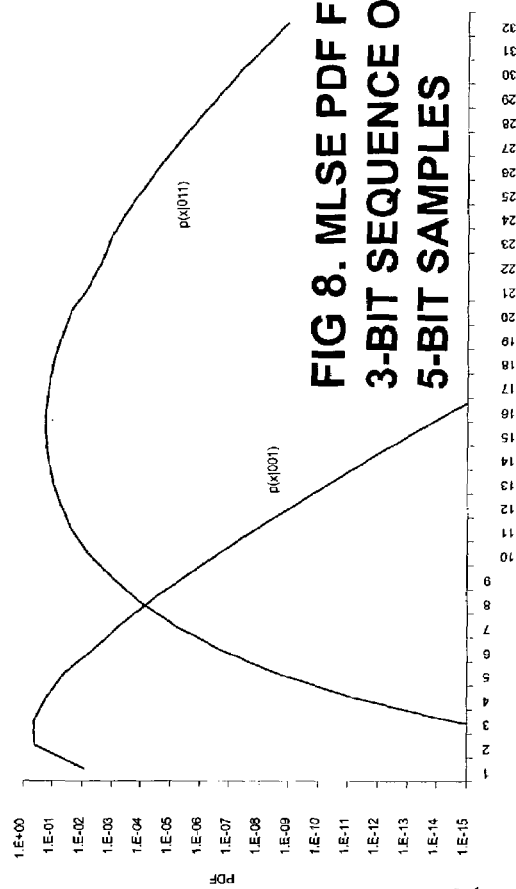
FIG 8. MLSE PDF FOR 3-BIT SEQUENCE OF 5-BIT SAMPLES
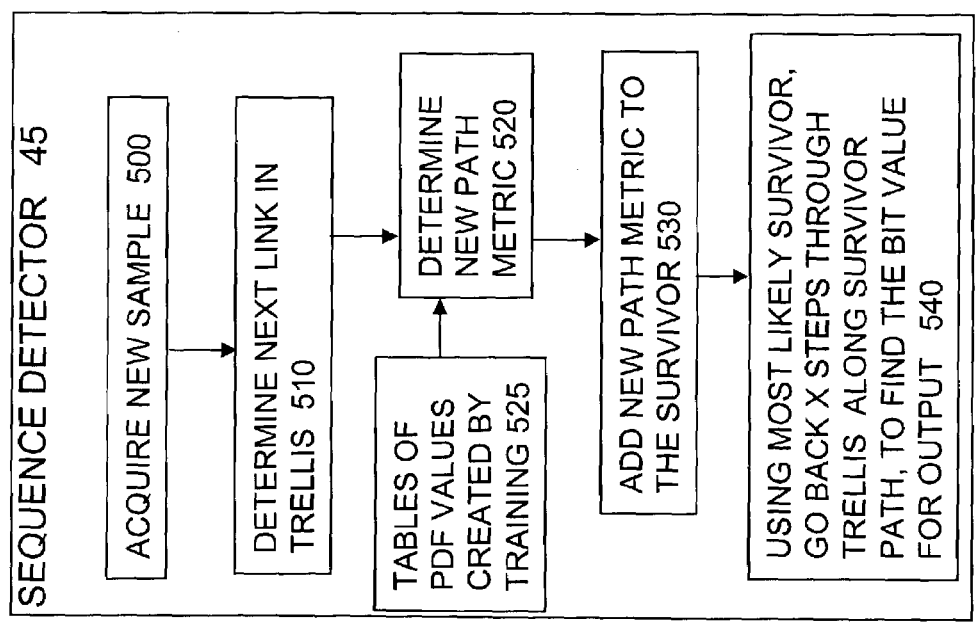
FIG 6. MLSE SEQUENCE DETECTOR

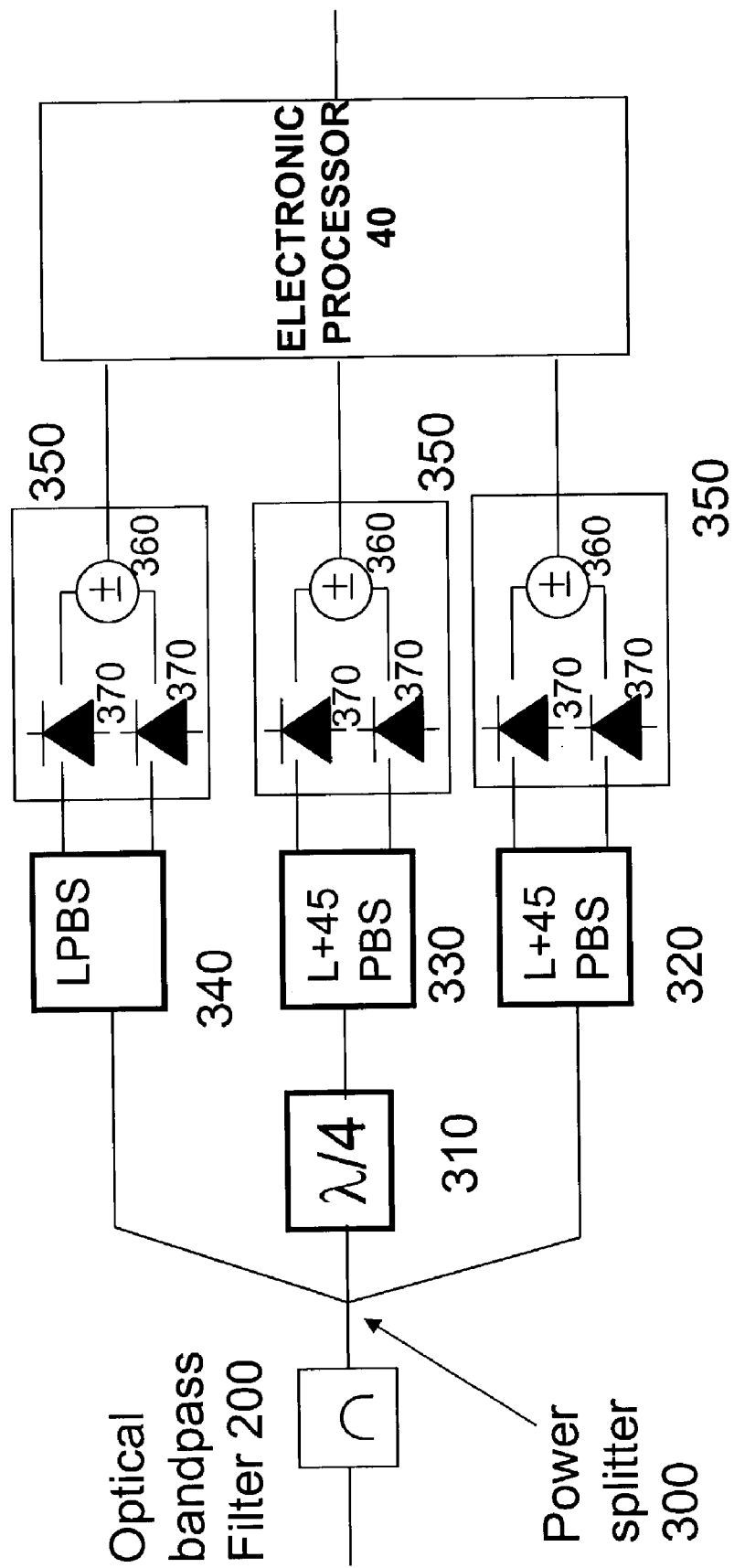
FIG 9. RECEIVER HAVING BALANCED DETECTORS

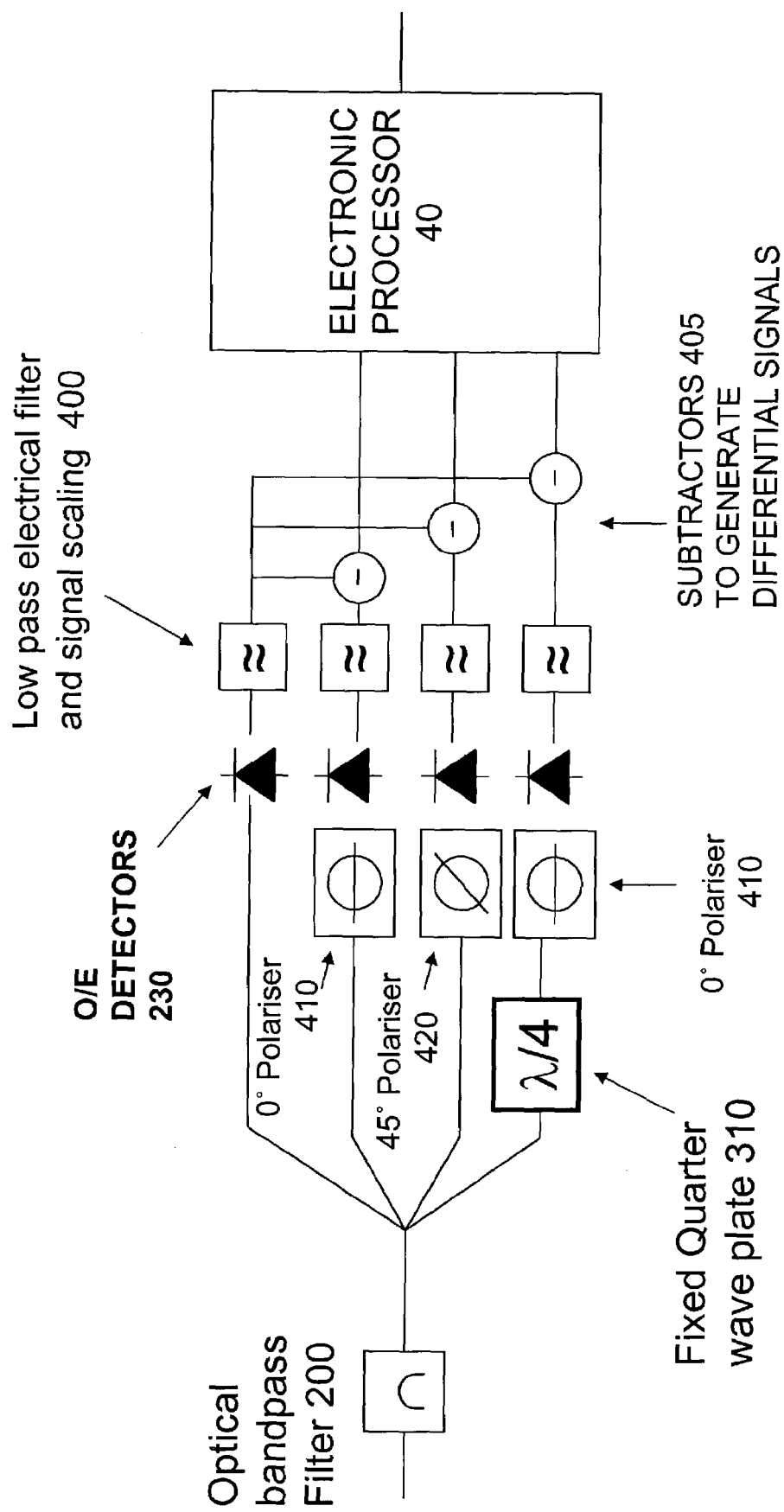
FIG 10. Receiver with 3 differential electrical signals from 4 optical components using only 4 detectors, and a single wave plate

POLARIZATION DIVERSITY RECEIVER FOR OPTICAL TRANSMISSION SYSTEM

FIELD OF THE INVENTION

This invention relates to receivers for optical transmission systems, to nodes for such systems, to methods of receiving optical signals, and to methods of offering a transmission service over such apparatus.

BACKGROUND TO THE INVENTION

Known optical transmission systems can be broadly categorized as direct detection, or coherent detection systems. In direct detection systems, at the receiver, the signal power is measured and therefore any phase and polarization information in the optical signal is ignored and lost. In coherent detection systems, inphase and quadrature components of the optical field are detected, which enables the use of phase modulation as well as amplitude modulation, and so two channels can be transmitted having orthogonal phases. It is also known that two further channels can be transmitted using orthogonal polarizations, if in addition the receiver is polarization diverse. Direct detection systems have nevertheless dominated the market for long haul transmission systems due to their simplicity. In contrast coherent receivers require careful polarization alignment and phase tracking, which is difficult and can limit the cost/performance trade off. In typical systems, the polarization may change at rates up to kHz levels, while phase variations can be typically up to MHz levels.

Both coherent and direct detection systems are also limited in high capacity systems by distortions introduced by the optical path, mostly optical fiber. There are many such distortions, including nonlinearities such as four wave mixing, but the principal ones are usually chromatic dispersion (CD) and polarization mode dispersion (PMD). PMD can vary over periods of minutes, sometimes much less and so needs adaptable control. Many complex solutions have been tried to compensate for PMD and CD with limited success. Solutions which correct the distortion in the optical domain involve expensive optical components.

Among the known PMD compensation techniques, electrical domain (post-detection) approaches are particularly attractive because of their potential for compact and cost-effective implementation in the chip sets at the receiver. Electronic equalizers using simple feedforward and decision feedback structures have been proposed for mitigating intersymbol interference (ISI) in optical communications by for example J. H. Winters and R. D. Gitlin, "Electrical signal processing techniques in long-haul fiber-optic systems," IEEE Trans. Commun., vol. 38, pp.1439–1453, September 1990.

They have been recently implemented and tested at 10 Gb/s using integrated SiGe technology as analog equalizers for PMD mitigation as shown by H. Bülow, R. Ballentin, W. Baumert, G. Maisonneuve, G. Thielecke, and T. Wehren, "Adaptive PMD mitigation at 10 Gbit/s using an electronic SiGe equalizer IC," in Proc. ECOC 1999, vol. II, pp. 138–139. However, it is noted that they do not deliver the performance gains typically expected and the optimization of filter coefficients adaptively, even with the simple and well known least mean squares (LMS) algorithm is still a challenging task at the high data rates at which optical systems operate. An example of an electronic compensator for a conventional 10 Gb/s optical transmission system has been announced by Santel Networks, of Newark, Calif. They claim that it provides a single solution for mitigating impairments from PMD and CD. It uses an equalizer for use on a directly detected electrical signal.

Since currently all installed high data rate systems use direct detection, the polarization and phase information is lost during detection. Diversity can provide advantages for PMD mitigation by making more efficient use of the available information. A known technique based on adaptive optics and diversity detection is described by B. W. Hakki, "Polarization mode dispersion compensation by phase diversity detection," in IEEE Photon. Technol. Lett., vol. 9, Jan. 1997, pp.121–123, where a polarization beam splitter (PBS) is used to split the signal into two orthogonal polarizations that are recombined in the electrical domain using an electrical delay line and a combiner. However this requires a polarization controller, which is likely to be expensive and bulky if they are to respond fast enough. Another diversity detection scheme that is based on fixed optics is presented in H. Bülow, "Equalization of bit distortion induced by polarization mode dispersion," in Proc. NOC 1997, pp. 65–72 in which three polarizations are extracted from the optical signal to be recombined in the electrical domain. In this scheme the three receiver photodetector signals are adaptively weighted by different weighting factors and then superimposed. With only 3 detectors arranged for maximum polarization diversity, with polarization states uniformly distributed on an equatorial plane of the Poincaré sphere, there will be an orientation of the fibre's principal states for which there is no improvement in PMD impairment. If the detectors polarization states do not have this maximal separation, there will be input states with a substantial noise penalty, even in the absence of PMD.

IEEE PHOTONICS TECHNOLOGY LETTERS, VOL. 14, NO. 4, APRIL 2002 465 "A Novel Polarization Diversity Receiver for PMD Mitigation" by A. O. Lima, I. T. Lima, Jr., Student Member, IEEE, T. Adali, Senior Member, IEEE, and C. R. Menyuk, Fellow, IEEE shows another polarization diversity receiver using simple fixed optics and electronics for incorporating equalization into the diversity receiver structure. In this case, six polarizations are used, which can be represented as three pairs, each diametrically opposed on the Poincaré sphere, and on three mutually perpendicular axes. Six detectors are used and the six electrical signals are fed to a transversal filter.

SUMMARY OF THE INVENTION

It is an object of the present invention to provide improved apparatus and methods. According to a first aspect of the present invention, there is provided a polarization diversity receiver for use in an optical transmission system, to receive an optical signal carrying traffic, the receiver having:

an optical section for generating from the received optical signal a number of polarization diverse component optical signals that substantially represent amplitude and polarization state information of the received optical signal, by respective polarization transformations to respective points on a Poincaré sphere, the points being spaced apart, and mutually related by Poincaré sphere rotations which are not all close to 90 degrees, and a convertor for converting the component optical signals into component electrical signals for recovering the transmitted traffic.

A minimum of four signal measurements is necessary if useful improvements in PMD penalty are to be achieved for all possible combinations of signal polarization state, and for all possible principal states of polarization for the transmission system. With only 3 detectors arranged for maximum polarization diversity, with polarization states uniformly distributed on an equatorial plane of the Poincaré sphere, there will be an orientation of the fiber's principal states for which there is no improvement in PMD impairment. If the detectors' polarization states do not have this maximal separation, there will be input states with a substantial noise penalty, even in the absence of PMD.

With four or more detectors, such problems can be avoided. The polarization states to which the detectors respond are preferably distributed uniformly over the Poincaré sphere. Polarization states which all lie in the same equatorial plane of the Poincaré sphere must be avoided, as it is not possible to correct PMD penalties when all detectors are equally responsive to both principal polarization states of the transmission system.

By having the transformations to points not on mutually perpendicular axes and spaced apart, the number of polarization component optical signals or component electrical signals can be reduced from the six used in the above mentioned prior art, yet still retaining most of the advantages of polarization diversity. By reducing the number of such signals, the number of optical components can be reduced, the number of detectors can be reduced, and the complexity of the electronic processor can be reduced. This can enable significant cost and size reductions. The need for precise polarization tracking in the receiver can be reduced or eliminated completely. As coherent detectors need either polarization tracking or two detectors for in phase and quadrature components on each polarization component, the advantages appear more notable for the case of direct detectors.

An additional feature of some embodiments is the points being substantially equally spaced apart on the Poincaré sphere.

This helps maximize the polarization diversity and signal to noise ratio.

An additional feature of some embodiments is the optical section having fixed components to generate the component optical signals without tracking.

Eliminating tracking completely helps enables the optical section to be relatively simple, to reduce size and cost.

An additional feature of some embodiments is provision for generating three or more derived signals from linear combinations of the component electrical signals. This can include subtractors for generating differential signals. This enables the number of electrical signals to be reduced and so enables the complexity and cost of the electronic processor to be reduced.

An additional feature of some embodiments is that at least three of the derived electrical signals are each proportional to the excess of signal power in one of three selected polarization states over the signal power in the respective orthogonal polarization state, the three selected polarization states chosen such that the directions of their Stokes vectors, as represented on the Poincaré sphere, are substantially mutually perpendicular. From the transformation properties of Stokes parameters, there are various ways of deriving these. They can be derived from four essentially simultaneous measurements of polarization states, or from measurements of three polarization states, combined with a measurement of the total signal power. Provided that the polarization states are not co-planar, the four Stokes parameters can be calculated from linear combinations of the four measured powers. These differential signals can be derived from optical component signals which are selected to be relatively easy to generate with a minimum of optical components. The choice of linear and circular states for the Stokes frame of reference is conventional, but not essential. In general, arbitrary elliptical polarization states can be selected as the basis vectors describing the polarization state. If the basis vectors are orthogonal, they can be converted to the conventional description by a simple mathematical operation corresponding to a rotation of the Poincaré sphere.

An additional feature of some embodiments is the optical section comprising elements for polarization rotation and polarization selection for generating the component optical signals.

These are convenient and straightforward to implement and can either be separate elements coupled in series or integrated together for example, as in the case of polarization beam splitters.

An additional feature of some embodiments is an electronic processor arranged to compensate for Polarization Mode Dispersion in the optical signal.

An additional feature of some embodiments is the electronic processor having a sequence detector for carrying out the compensation.

This can enable better results than other algorithms, at the expense of more complexity.

An additional feature of some embodiments is the electronic processor having an equalizer for carrying out the compensation.

An additional feature of some embodiments is an electronic processor being arranged to derive polarization demultiplexed data.

This enables polarization multiplexed transmission, for additional capacity, at the expense of more electronic processing. This becomes more advantageous as electronic processing becomes cheaper and more highly integrated.

According to a second aspect of the present invention, there is provided a polarization diversity receiver for use in receiving an optical signal in an optical transmission system, the receiver having:

an optical section for generating from the received optical signal a number of polarization diverse component optical signals that substantially represent amplitude and polarization state information of the received optical signal, a convertor for converting the component optical signals into component electrical signals and a sequence detector for recovering the transmitted traffic.

This is notable for using sequence detection rather than the transversal filtering used in the above mentioned prior art, regardless of how many component optical signals are generated, and regardless of whether or not the separated signals represented on the Poincaré sphere lie in a single plane or on mutually perpendicular axes. This can produce better results in terms of error rates or noise immunity, and thus lead to more cost effective or higher capacity transmission. As in the first aspect, most of the advantages of polarization diversity can be retained. The need for precise polarization tracking in the receiver can be reduced or eliminated completely.

An additional feature of some embodiments is the optical section having fixed components to generate the component optical signals without tracking.

Eliminating tracking completely helps enables the optical section to be relatively simple, to reduce size and cost.

An additional feature of some embodiments is the optical section comprising elements for polarization rotation and polarization selection for generating the component optical signals.

These are convenient and straightforward to implement.

An additional feature of some embodiments is the component electrical signals being converted into differential signals.

This can reduce the number of signals and hence the complexity and cost of the electronic processor.

An additional feature of some embodiments is the sequence detector being arranged to compensate for PMD in the optical signal.

An additional feature of some embodiments is an electronic processor arranged to derive polarization demultiplexed data.

This enables polarization multiplexed transmission, for additional capacity, at the expense of more electronic processing. This becomes more advantageous as electronic processing becomes cheaper and more highly integrated.

An additional feature of some embodiments is the optical section being arranged to carry out polarization transformations to respective points on a Poincaré sphere, the points being spaced apart such that they do not lie in any one equatorial plane.

By avoiding having the transformations of the separated signals all in a single equatorial plane on the Poincaré sphere, whatever the orientation of the principal states, it will always be possible to extract information about the relative signal powers propagating in the fast and slow polarization states.

According to a third aspect of the present invention, there is provided a polarization diversity receiver for use in receiving an optical signal in an optical transmission system, the receiver having:

an optical section for generating from the received optical signal a number of polarization diverse component optical signals that substantially represent amplitude and polarization state information of the received optical signal, and one or more balanced detectors for converting the component optical signals into component electrical signals for recovering the transmitted traffic.

The use of a balanced detector is notable as it enables the number of electrical signals to be reduced, and so helps simplify the device and reduce costs or size or improve integration. As in the first and second aspects, the advantages of polarization diversity are retained. The need for precise polarization tracking in the receiver can be reduced or eliminated completely.

An additional feature of some embodiments is the optical section having fixed components to generate the component optical signals without tracking.

Eliminating tracking completely helps enables the optical section to be relatively simple, to reduce size and cost.

An additional feature of some embodiments is the optical section comprising elements for polarization rotation and polarization selection for generating the component optical signals.

These are convenient and straightforward to implement.

An additional feature of some embodiments is an electronic processor arranged to compensate for PMD in the optical signal.

An additional feature of some embodiments is the electronic processor having a sequence detector for carrying out the compensation.

This can enable better results than other algorithms, at the expense of more complexity.

An additional feature of some embodiments is the electronic processor having an equalizer for carrying out the compensation.

An additional feature of some embodiments is an electronic processor arranged to derive polarization demultiplexed data.

This enables polarization multiplexed transmission, for additional capacity, at the expense of more electronic processing. This becomes more advantageous as electronic processing becomes cheaper and more highly integrated.

An additional feature of some embodiments is the optical section being arranged to carry out polarization transformations to respective points on a Poincaré sphere, the points being spaced apart such that they do not lie in any one equatorial plane.

A fourth aspect provides a polarization diversity receiver for use in an optical transmission system, to receive an optical signal carrying traffic, the receiver having:

an optical section for generating from the received optical signal a number of polarization diverse component optical signals that substantially represent amplitude and polarization state information of the received optical signal, and for generating an unpolarised component optical signal, and a convertor for converting the component optical signals into component electrical signals for recovering the transmitted traffic.

The addition of an unpolarised component is another way of enabling fewer optical or electrical component signals, in this case achieving good results down to 4 optical signals.

An additional feature of some embodiments is the polarization diverse optical component signals comprising three or more signals having respective polarization transformations to respective points on a Poincaré sphere, on mutually perpendicular axes on the sphere.

This can be implemented with relatively simple, compact and cost effective optical components.

An electronic processor for use in the receiver is also claimed separately.

Software for implementing the processor is also claimed separately. This acknowledges that software can be a valuable, separately tradable commodity. It is intended to encompass software, which runs on or controls "dumb" or standard hardware, to carry out the desired functions. For similar reasons, it is also intended to encompass software which "describes" or defines the configuration of hardware, such as HDL (hardware description language) software, as is used for designing silicon chips, or for configuring universal programmable chips, to carry out desired functions.

Another aspect provides a node for an optical transmission system having one or more of the receivers. Another aspect provides a method of receiving an optical signal carrying traffic in an optical transmission system, the method having the steps of:

converting the received optical signal into a number of polarization diverse component optical signals that substantially represent amplitude and polarization state information of the received optical signal, by respective polarization transformations to respective points on a Poincaré sphere, the points being spaced apart such that they are not all on mutually perpendicular axes, and converting the component optical signals into component electrical signals for recovering the transmitted traffic.

Another aspect provides a method of offering a data transmission service over a transmission system using the receiver. The advantages of the invention can enable improvements to be made in the system performance such as being more reliable or more flexible, having a greater capacity, or being more cost effective. Consequently data transmission services can be enhanced, and the value of such services can increase. Such increased value over the life of the system, could prove far greater than the sales value of the equipment.

Another aspect provides a polarization diversity receiver for use in an optical transmission system, to receive an optical signal carrying traffic, the receiver having:

an optical section for generating from the received optical signal four or five polarization diverse component optical signals that substantially represent amplitude and polarization state information of the received optical signal, by respective polarization transformations to respective points on a Poincaré sphere, the points being substantially equally spaced apart, and a convertor for converting the component optical signals into component electrical signals for recovering the transmitted traffic.

Any of the features can be combined with any of the aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which:

FIG. 1 shows an optical transmission system according to an embodiment of the invention FIG. 2 shows a receiver having four component optical signals FIG. 3 shows a view of a Poincaré sphere corresponding to the embodiment of FIG. 2, FIG. 4 shows a wave plate and polarizer implementation for the receiver of FIG. 2, FIG. 5 shows an optical transmission system according to another embodiment of the invention, having a receiver using a sequence detector, FIG. 6 shows functions of a sequence detector in the form of an MLSE (maximum likelihood sequence estimator), FIG. 7 shows a view of a trellis for the MLSE, FIG. 8 shows an example of a pdf (probability distribution function) for the MLSE, FIG. 9 shows an embodiment of a receiver having balanced detectors, and FIG. 10 shows an embodiment of a receiver having 3 differential electrical signals from 4 optical components.

DETAILED DESCRIPTION OF PREFERRED EMBODIMENTS

FIG. 1, Transmission System

FIG. 1 shows an example of an optical transmission system according to an embodiment of the invention. It includes a transmitter 20 coupled to a transmission fiber 90. User data is transmitted by the transmitter along the fiber following conventional principles. In typical systems the fiber may be many kilometres in length. The fiber and components in the optical path such as optical amplifiers and compensators, can introduce noise and distortions such as PMD. The receiver 50 tries to pick out the original signal from the noise.

The receiver includes an optical section 30 which outputs component optical signals which include substantially all of the phase and polarisation information of the received optical signal. The component optical signals are converted into corresponding component electrical signals by optical to electrical converter 35 typically in the form of conventional direct detection square law detectors. The component electrical signals are fed to electronic processor 40 which produces one or more output signals which are the transmitted user data. These may be subject to further processing such as FEC (Forward Error Correction) following established practice.

FIG. 2, Receiver

FIG. 2 shows a receiver according to an embodiment of the invention suitable for use in FIG. 1 or in other transmission systems. The received optical signal is fed through optical band path filter 200 (optional) and split into four equal optical components by a power splitter. Each of the split signals are subject to different polarisation rotations to achieve separation on the Poincaré sphere as shown in more detail in FIG. 3. In the example illustrated, to minimise the number of components, a first of the split signals needs no rotation. The other three are rotated to achieve substantially equal and maximum separation on the sphere, to maximise the benefit of polarisation diversity. Although the degree of polarisation diversity is less than the prior art example using six split beams diametrically opposed in the sphere, the advantage of having fewer components will normally outweigh the disadvantage of less diversity. With only 3 detectors arranged for maximum polarization diversity, with polarization states uniformly distributed on an equatorial plane of the Poincaré sphere, there will be an orientation of the fiber's principal states for which there is no improvement in PMD impairment. If the detectors polarization states do not have this maximal separation, there will be input states with a substantial noise penalty, even in the absence of PMD. Clearly the received optical could be split into five rather than four, and different rotations used to achieve substantially equal and maximum separations on the sphere (not illustrated). Each of the split signals with their different rotations are fed to polarisers 220 followed by optical to electrical converters 230. The purpose is to produce electrical component signals each representing a selected polarisation. This enables the polarisation information which is normally lost in the conversion to electrical form to be preserved in the differences in the electrical signals. Processing of the component electrical signals can enable PMD compensation or polarisation demultiplexing or any type of processing of the polarisation information. As illustrated, the component electrical signals are passed through low pass filters 240 before conversion from analogue to digital form by converters 250, in this example 5-bit converters are shown, though other degrees of quantisation can be used as desired. The sampling rate of the converters can by the same as the data rate, or oversampling can be used as desired. An electronic processor 40 is provided for carrying out digital processing to achieve PMD compensation or other processing. For ten Gbits optical data rates, only a limited amount of digital processing is currently practical. Transversal filters can be implemented as described in the above referenced prior art, or, as described below in more detail, MLSE algorithms can be implemented in this electronic processor.

FIG. 3, Poincaré's Sphere

FIG. 3 shows a Poincaré sphere having three axes, S1, S2 and S3. The polarisation state of the received optical signal is shown at C1 and the states of the three rotated components are shown at C2, C3 and C4 having the following transformations $$\begin{pmatrix} -\frac{2\sqrt{2}}{3} \\ \frac{\sqrt{6}}{3} \\ -\frac{1}{3} \end{pmatrix}, \begin{pmatrix} \frac{2\sqrt{2}}{3} \\ 0 \\ -\frac{1}{3} \end{pmatrix}, \text{ and } \begin{pmatrix} -\frac{2\sqrt{2}}{3} \\ -\frac{\sqrt{6}}{3} \\ -\frac{1}{3} \end{pmatrix}$$

to achieve equal and maximum separation. This can be implemented with polarisers, or polarising couplers in front of each detector. Most polarisers select linear polarisation states. Conversion between elliptical and linear states is possible using wave plates. The effect of a wave plate is to rotate the polarisation state on the Poincaré sphere through an angle equal to the phase delay, about an axis joining the polarisation states of the fast and slow axes. For readily available quarter wave plates, the rotation is 90°. If incident light is linearly polarised and the slow axis is aligned with the y-axis (+90°), then light linearly polarised at 45° to both x- and y-axes is converted to right circularly polarised light.

FIG. 4, Implementation of Wave Plates and Polarisers for the Receiver of FIG. 2

FIG. 4 shows an example of a wave plate and polariser implementation for the receiver of FIG. 2, to detect 4 polarisation states, uniformly distributed over Poincaré sphere as shown in FIG. 3. A beam splitter 205 splits the incoming beam into two equal parts, each fed to different quarter wave plates Q1 and Q2. Each quarter wave plate has two outputs, fed to polarisers P1–P4. The outputs of the polarisers are fed to the detectors 230.

The relative orientations of the quarter wave plates Q1 and Q2 and the linear polarisers required for output states for the four optical components fed to the detectors can be derived following conventional principles, with the following results. For Q1, the fast axis is +22.5°, while the slow axis is −67.5°. P1 has an angle of +4.868°. P2 has an angle of −49.868°. For Q2, the fast axis is −22.5°, while the slow axis is +67.5°. P3 has an angle of −4.868°. P4 has an angle of +49.868°.

FIGS. 5–8, A Transmission System Using Sequence Detector

FIG. 5 shows an optical transmission system according to another embodiment. This is similar to the embodiment of FIG. 1, but the electronic processor is in the form of a sequence detector 45. Corresponding reference numerals to those of FIG. 1 are used. Examples of sequence detectors include MAP (maximum a posteriori) and MLSE algorithms. An example of an MLSE algorithm will now be described with reference to FIGS. 6–8.

Instead of making decisions on individual bits, maximum likelihood detectors make decisions on sequences of bits (symbols). Ideally, given a noisy set of samples of the received data sequence x, the symbol (S) that maximises the probability p(S|x) is selected. This is called the maximum a posteriori probability. If it is assumed that symbols are equally likely (e.g. equal numbers of 0's and 1's, or equal numbers of 00, 01, 10, 11, etc), then Bayes law can be used to look for the symbol which maximises p(x|S). This is the maximum likelihood sequence estimator (MLSE). This corresponds to searching through each symbol S, and selecting that which has the highest probability of generating a noisy data sample x. It is equally valid to search for the symbol that maximises the log-likelihood probability ln [p(x|S)] since the log function is monotonic.

If it is assumed that the noise on each sample is independent (this may not be strictly true for fractional samples which are correlated by the low pass electrical filter), then the log likelihood breaks up into a sum of independent probabilities for individual bits:

$$\ln[p(x|S)] = \sum_k \ln[p(x_k|S)] \qquad \text{Eq 1}$$

If we know the probability distribution for each bit of each symbol S, we can calculate the total log-likelihood probabilities for different sequences. The most probable sequence of symbols can be selected. It is possible in principle to have a sequence of a single bit, but 3 or 5 bits is usually more suitable. The threshold is set to minimise the sum of the errors produced by 1's and 0's. For cases where there is no ISI, each bit is independent and a complex MLSE acting over many bit sequences will perform no better than a standard decision threshold detector.

The MLSE algorithm is initially trained using a data set with noise that is independent of the measurement data. With knowledge of the actual bit sequence, this training data is used to create probability tables $P(x_k|S)$, for each state (S). FIG. 8 shows an example of a graph of a PDF table generated for a case with 100 ps PMD, with two density functions shown. For clarity, the MLSE displayed here makes decisions based on 3 bits, so there are 8 states of which only two are shown for the sake of brevity. Such tables can be created using training sequences following established principles. For a 3 bit MLSE, the PDFs are created based around the central bit. The decision timing of the samples is optimised. It can be seen that in the presence of distortion such as PMD, the PDF of the voltages is dependent on adjacent bits.

Since there is only a finite amount of training data, a fitting function is used to interpolate the pdf where there is little or no training data. For square-law receivers, a root-Gaussian fitting function can be used where the PDF depends on the root of the detected voltage or the amplitude of the field on the detector, whereas coherent receivers have a Gaussian fitting function applied, where the detected voltage is proportional to incident field. This resulting PDF is shown as a solid line in FIG. 8.

Viterbi Algorithm

A maximum likelihood detector bases its decisions on sequences of bits. Each sequence of bits is called a state. When a new bit enters the detector, the routine determines the next most likely state. It is impossible for the state to change from 111 to 000. The two possible changes might be from 111 to 110, or to remain at 111. The well known Viterbi algorithm makes use of the fact that the noise (as opposed to ISI) on each sample is independent. The total log likelihood becomes the sum of independent increments. Here, the increment is defined as:

$$\Gamma(S)_{k_1}^{k_2} \equiv \sum_{k=k_1}^{k_2-1} \ln[p(x_k|S)] \qquad \text{eq. 2}$$

The Viterbi algorithm creates a trellis of connections or paths between states. The length of the path is an indication of the probability of the transition. The log-likelihood probability of moving from state $S_i$ at time t=k, to a new state $S_j$ at time t=k+1 may be calculated as the sum of two independent parts:

$$\Gamma(S_j)_0^{k+1} = \Gamma(S_i)_0^k + \Gamma(S_j)_k^{k+1} \qquad \text{eq.3}$$

where $\Gamma(S_j)_0^{k+1}$ is the New path length, $\Gamma(S_i)_0^k$ is the Previous survivor length and $\Gamma(S_j)_k^{k+1}$ is the Path length.

Since a binary system is used, each new state can only be arrived at from one of two previous states. The Viterbi algorithm creates a trellis of connections between states, discarding connections that are least likely. A full explanation of the Viterbi algorithm can be found in standard textbooks, and so need not be set out in more detail here. FIG. 7 shows how state 101 at time k+1 may be reached from either state 010 or 110 at time k. However, since the survivor length of state 010 is less than that of 110, only the connection 010→101 is retained. A new survivor length is created by adding the path length calculated at time t=k+1, using the probability tables described above with reference to FIG. 8.

At this stage no final decision has been made as to the most probable bit at time t. In principle the Viterbi algorithm can make a final decision when all the data has arrived, and the trellis converges on a final state. In practice, where there is a continuous flow of data, it is usual to wait a finite time δ. If δ is long enough, all paths at time t=k will converge on the same state at time t=k−δ. In this implementation an initial search is used to find the smallest survivor length at time t=k. The trellis is then traversed from this initial state back to state t=k−δ and a hard decision is made. This is shown in figure where the trellis path is traversed from state 100 at time t=k+1 to 100 at time t=k−3. A sliding window is used so that the trellis length is maintained at depth δ.

The length of the trellis is dependent on the number of states and the method of searching back through the trellis. If an initial search is used to select the initial state with lowest survivor path length then the trellis length can be reduced (this is the method used here). However, this comparison is a complex operation, especially for large numbers of states. It can be more computationally efficient to use a large trellis length and select an arbitrary initial path.

In FIG. 6 an overview of some of the principal steps in an MLSE using the viterbi algorithm is illustrated. A new sample is acquired at step 500 from each of the component signals. At 510 a next link in the trellis is discovered. Tables of PDF values 525 are used to determine new path metrics (or path lengths) at 520. The new path metrics are added to the survivors at step 530 to create new survivor lengths. Each survivor is a different path through the trellis of possible sequences. The survivor length values indicate the likelihood of a sequence defined by the respective survivor. The smallest survivor length is found and this indicates the sequence with the maximum likelihood. At step 540 a central bit of that sequence is output by following the survivor path back through the trellis.

As discussed above, FIG. 7 shows a small part of a trellis for a three-bit MLSE. The eight possible three-bit sequences are shown at time k with arrows leading to the next possible three-bit sequence at time k+1. A column of previous survivor lengths up to time k is recorded, two examples are illustrated. At time k+1 the path lengths for the most likely of the two sequences leading to each state are recorded (one is illustrated having a value of 5). This is added to the shortest of two possible survivor lengths (20 in the example illustrated) to give the new survivor length for each of the eight possible three-bit sequences at time k+1 (resulting in a new survivor length of 25).

Over Sampling

An A/D converter may be used that supplies more than 1 sample per bit. In coherent transmission, samples may be available from both I and Q ports. Extra probability tables are stored for this extra information. This doubles the number of tables required for fractional sampling (2 samples/bit), or for decisions made using both I and Q ports. If fractional samples are used on I and Q ports, a four-fold increase in memory is needed.

Each path length is determined $$\Gamma(S_j)_k^{k+1} = \Gamma(S_j)_k^{k+1}|_{sample1} + \Gamma(S_j)_k^{k+1}|_{sample2} \cdots \Gamma(S_j)_k^{k+1}|_{sampleN} \qquad \text{eq.4}$$

This assumes statistical independence between the samples. An option is to take into account the correlation between samples caused by filtering at the receiver, to improve the effectiveness of the algorithm.

FIG. 9, Receiver Having Balanced Detectors

FIG. 9 shows a receiver according to another embodiment of the invention. As before, an optical band path filter is used to filter the received optical signal and a power splitter 300 is used to split the signal into three parts. Polarisation rotation and polarisation selection is carried out by elements of the optical section. In the example illustrated, this is carried out by polarisation beam splitters PBS. To achieve maximum polarisation diversity, the polarisations are extracted using a linear polarisation beam splitter 340 on a first of the split signals. A second of the split signals has a quarter wave plate 310 followed by a linear plus 45° PBS 330. A third split signal has a linear plus 45° PBS 320. Each PBS produces two optical outputs which are diametrically opposed on the Poincaré sphere.

Each pair of output optical signals is fed to a balanced detector 350. Each of these detectors includes a pair of photo diodes 370 with associated circuitry 360 for outputting a single electrical signal reflecting the difference between the two optical signals. Each of these differential electrical signals is fed to the electronic processor 40, which can be implemented in any of the ways described above. The use of a balanced detector enables the number of electrical signals to be reduced. Even if reduced from 6 to 3 or 4, this can vastly reduce the computational complexity of recovering the data. This in turn can reduce the number of components and therefore reduce costs or size, or improve integration. The balanced detectors can be used with different numbers of component optical signals, for example two or four.

FIG. 10 Receiver With 3 Differential Electrical Signals From 4 Optical Components Using Only 4 Detectors, and a Single Wave Plate A further reduction in the number of components is possible based on the concept that the three differential signals shown in FIG. 9 correspond to the commonly used Stokes parameters $s_1$, $s_2$, $s_3$. Here $s_1$ is the excess of horizontally polarized power to over vertically polarized light. $s_2$ is the excess of light linearly polarized at 45°, over 135° polarized light. $s_3$ is the excess of right circularly polarized light over left circularly polarized light [ref. Max Born & Emil Wolf, "Principles of Optics: Electromagnetic theory of propagation, interference and diffraction of light", 6$^{th}$ edition, Pergamon Press, 1986]. For a bandwidth limited optical source, such as a typical modulated optical signal, the signal within a short sampling instant is effectively fully polarized, and the fourth Stokes parameter (equal to the total signal power) is given by $$s_0^2 \approx \sqrt{s_1^2 + s_2^2 + s_3^2}.$$

The sum of the powers detected in pairs of orthogonal polarization states does not depend on the respective polarization states, and is equal to the total input power. It follows that signals equivalent to the three balanced outputs in FIG. 9 can be derived from only four detectors.

For example, from the detectors sensitive to light linearly polarized at 0° or 90°.

$$s_1 = P_0 - P_{90}$$

$$s_o = P_0 + P_{90}$$

For each of the remaining Stokes parameters, a single additional detector is required.

$$s_2 = P_{45} - P_{135} = 2P_{45} - s_0$$

$$s_3 = P_{RC} - P_{LC} = 2P_{RC} - s_0$$

In this case there are detectors selecting linearly polarized light at 0°, 90° and 45°, and right circularly polarized light. FIG. 10 shows another alternative scheme where the total input power ($s_0$) is measured directly, and there are three detectors selecting 0, 45° linearly polarized light, and right circular light. As before, an optical bandpass filter 200 feeds a beam splitter. This time the beam is split into 4. A fixed quarter wave plate 310 is provided on one branch, followed by a 0° polarizer 410. On another branch there is a 0° polarizer 410 without a quarter wave plate, and on another branch a 45° polarizer 420. A fourth branch is fed to the detectors 230 with no polarizer. After detection, the four electrical signals are fed through low pass electrical filters and scalers 400. Then subtractors 405 are used to generate differential electrical signals by subtracting the fourth branch from each of the other branches. In principle, an arrangement of balanced detectors could be used to generate the differential signals.

It will be apparent from the transformation properties of Stokes vectors, that this approach can be applied to any four essentially simultaneous measurements of polarization states, or to measurements of three polarization states, combined with a measurement of the total signal power. Provided that the polarization states are not co-planar, the four Stokes parameters can be calculated from linear combinations of the four measured powers. If the polarization states fall close to a great circle on the Poincaré sphere, then the calculation is mathematically ill-conditioned, and there will be an increased sensitivity to measurement noise for some input polarization states.

Concluding Remarks

As has been described above, a polarization diversity receiver has an optical section for converting the received optical signal into four or five polarization diverse component optical signals that substantially represent amplitude and polarization state information of the received optical signal, by respective polarization transformations to respective points on a Poincaré sphere, the points being equally spaced apart to maximise polarization diversity, even in the worst case input polarization state. Detectors produce component electrical signals from each of the component optical signals, for electronic processing to compensate for PMD. By reducing the number of component optical signals significant cost and size reductions are enabled. The need for precise polarization tracking in the receiver can be reduced or eliminated completely. Balanced detectors can be used to reduce the number of electrical signals. The electrical processing can use sequence detection.

Other variations will be apparent to those skilled in the art, having corresponding advantages to those set out above, within the scope of the claims.

The invention claimed is:

1. A polarization diversity receiver for use in an optical transmission system, to receive an optical signal carrying traffic, the receiver having:
    an optical section for generating from the received optical signal at least four polarization diverse component optical signals that substantially represent amplitude and polarization state information of the received optical signal, by respective polarization transformations to respective points on a Poincaré sphere, the points being spaced apart such that they do not lie in any one plane passing through the center of the sphere, and mutually related by Poincaré sphere rotations which are not all close to 90 degrees, and
    a convertor for converting the component optical signals into component electrical signals for recovering the transmitted traffic.

2. The receiver of claim 1, the points being substantially equally spaced apart on the Poincaré sphere.

3. The receiver of claim 1, the optical section having fixed components to generate the component optical signals without tracking.

4. The receiver of claim 1, having provision for generating three or more derived signals from linear combinations of the component electrical signals.

5. The receiver of claim 4 in which at least three of the derived electrical signals are each proportional to the excess of signal power in one of three selected polarization states over the signal power in the respective orthogonal polarization state, the three selected polarization states chosen such that the directions of their Stokes vectors, as represented on the Poincaré sphere, are substantially mutually perpendicular.

6. The receiver of claim 1, the optical section comprising elements for polarization rotation and polarization selection for generating the component optical signals.

7. The receiver of claim 1, having an electronic processor arranged to compensate for Polarization Mode Dispersion in the optical signal.

8. The receiver of claim 7, the electronic processor having a sequence detector for carrying out the compensation.

9. The receiver of claim 7, the electronic processor having an equalizer for carrying out the compensation.

10. The receiver of claim 1, having an electronic processor being arranged to derive polarization demultiplexed data.

11. A node for an optical transmission system having one or more of the receivers of claim 1.

12. A method of offering a data transmission service over a transmission system using the receiver of claim 1.

13. A polarization diversity receiver for use in receiving an optical signal carrying traffic in an optical transmission system, the receiver having:
    an optical section for generating from the received optical signal at least four polarization diverse component optical signals that substantially represent amplitude and polarization state information of the received optical signal by respective polarization transformations to respective points on a Poincaré sphere, the points being spaced apart such that they do not lie in any one plane passing through the center of the sphere;

a convertor for converting the component optical signals into component electrical signals and a sequence detector for recovering the transmitted traffic.

14. The receiver of claim 13, the component electrical signals being converted into differential signals.

15. The receiver of claim 13, the sequence detector being arranged to compensate for PMD in the optical signal.

16. The receiver of claim 13 having an electronic processor arranged to derive polarization demultiplexed data.

17. The receiver of claim 13, the optical section being arranged to carry out polarization transformations to respective points on a Poincaré sphere, the points being spaced apart such that they do not lie in any one plane passing through the center of the sphere.

18. The receiver of claim 13, the optical section having fixed components to generate the component optical signals without tracking.

19. The receiver of claim 13 the optical section comprising elements for polarization rotation and polarization selection for generating the component optical signals.

20. A method of receiving an optical signal carrying traffic in an optical transmission system, the method having the steps of:

converting the received optical signal into at least four polarization diverse component optical signals that substantially represent amplitude and polarization state information of the received optical signal, by respective polarization transformations to respective points on a Poincaré sphere, the points being spaced apart such that they do not lie in any one plane passing through the center of the sphere and, are mutually related by Poincaré sphere rotations which are not all close to 90 degrees, and converting the component optical signals into component electrical signals for recovering the transmitted traffic.

21. A polarization diversity receiver for use in an optical transmission system, to receive an optical signal carrying traffic, the receiver having:

an optical section for generating from the received optical signal four or five polarization diverse component optical signals that substantially represent amplitude and polarization state information of the received optical signal, by respective polarization transformations to respective points on a Poincaré sphere, the points being substantially equally spaced apart such that they do not lie in any one plane passing through the center of the sphere, and a convertor for converting the component optical signals into component electrical signals for recovering the transmitted traffic.

22. A polarization diversity receiver for use in an optical transmission system, to receive an optical signal carrying traffic, the receiver having:

an optical section for generating from the received optical signal three or more polarization diverse component optical signals that substantially represent amplitude and polarization state information of the received optical signal by respective polarization transformations to respective points on a Poincaré sphere, the points and the point representing the received optical signal, being spaced apart such that they do not lie in any one plane passing through the center of the sphere, and a convertor for converting the component optical signals and the received optical signal, into component electrical signals for recovering transmitted traffic.

23. The receiver of claim 22, the polarization diverse optical component signals comprising three or more signals having respective polarization transformations to respective points on a Poincaré sphere, on mutually perpendicular axes on the sphere.

* * * * *